United States Patent
Kambara et al.

(10) Patent No.: US 6,861,812 B2
(45) Date of Patent: Mar. 1, 2005

(54) DISCHARGE LAMP BALLAST WITH DC-DC CONVERTER

(75) Inventors: Takashi Kambara, Osaka (JP); Toshiaki Nakamura, Osaka (JP); Miki Kotani, Osaka (JP); Hirofumi Konishi, Osaka (JP); Toshifumi Tanaka, Osaka (JP)

(73) Assignee: Matsushita Electric Works, Ltd., Kadoma (JP)

( * ) Notice: Subject to any disclaimer, the term of this patent is extended or adjusted under 35 U.S.C. 154(b) by 75 days.

(21) Appl. No.: 10/220,639

(22) PCT Filed: Jan. 10, 2002

(86) PCT No.: PCT/JP02/00095

§ 371 (c)(1), (2), (4) Date: Sep. 4, 2002

(87) PCT Pub. No.: WO02/056646

PCT Pub. Date: Jul. 18, 2002

(65) Prior Publication Data

US 2003/0076053 A1 Apr. 24, 2003

(30) Foreign Application Priority Data

Jan. 12, 2001 (JP) .......................................... 2001-5706
Jul. 16, 2001 (JP) ........................................ 2001-215721

(51) Int. Cl.$^7$ ............................................... G05F 1/00
(52) U.S. Cl. ........................ 315/291; 315/307; 315/279
(58) Field of Search .................................. 315/307, 308, 315/291, 279, 276, 200 R, 224

(56) References Cited

U.S. PATENT DOCUMENTS

| 5,572,094 A | * | 11/1996 | Yamashita et al. | ........... 315/308 |
| 6,034,487 A | | 3/2000 | Yamashita et al. | ........... 315/244 |
| 6,281,642 B1 | * | 8/2001 | Konishi et al. | ............. 315/308 |
| 6,300,726 B1 | | 10/2001 | Daub | ......................... 315/291 |

FOREIGN PATENT DOCUMENTS

| DE | 198 43 643 | 5/1999 |
| EP | 1 021 072 | 7/2000 |
| JP | P2000-215996 A | * 8/2000 |

* cited by examiner

Primary Examiner—Tuyet T. Vo
(74) Attorney, Agent, or Firm—Oblon, Spivak, McClelland, Maier & Neustadt, P.C.

(57) ABSTRACT

An improved ballast for a discharge lamp includes a DC—DC converter which receives an input DC voltage from a voltage source to provide a pre-starting voltage to make the lamp ready for being ignited or started. The DC—DC converter has a switching element which is driven to turn on and off for generating the pre-starting voltage. A start-accelerating means in included in the ballast in order to vary at least one of the switching frequency and the on-period of the switching element based upon the monitored input DC voltage in a direction of accelerating the increase of the output DC voltage to the pre-starting voltage until the output DC voltage reaches the pre-starting voltage.

17 Claims, 7 Drawing Sheets

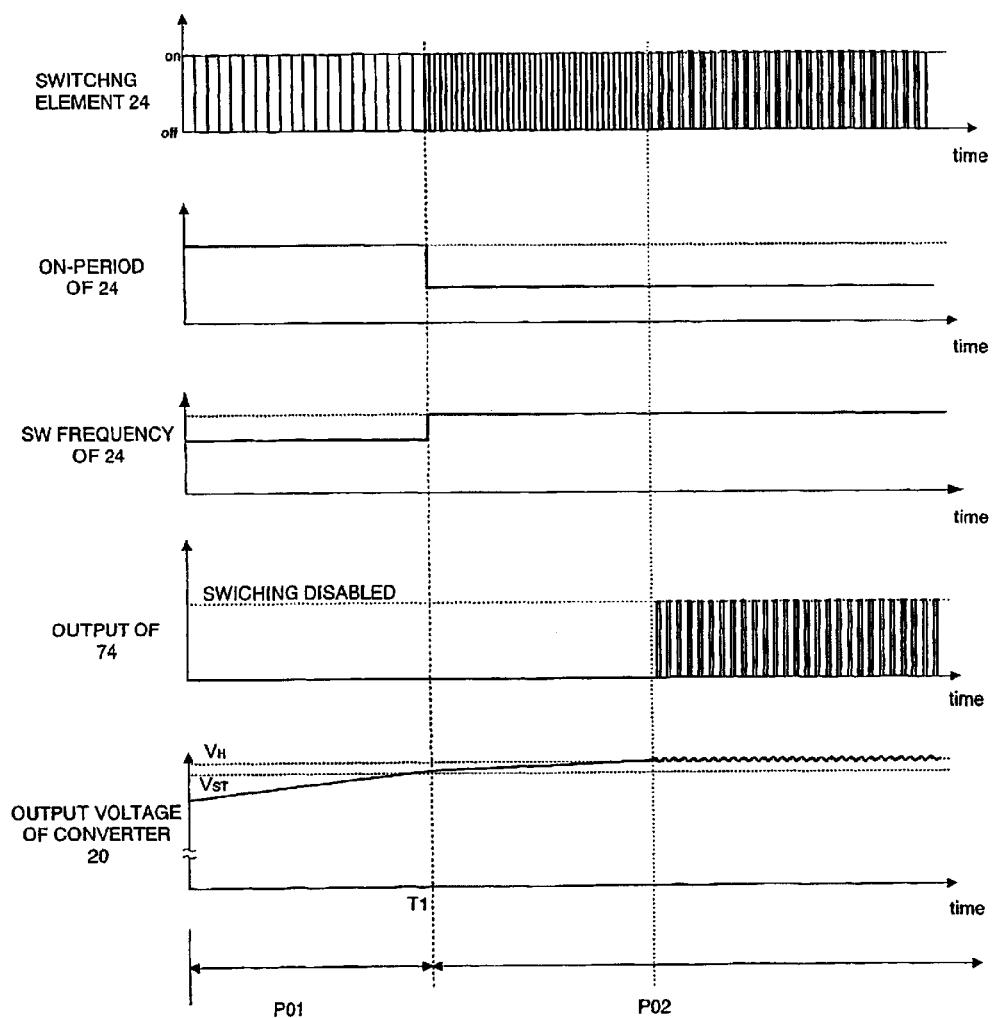

DISCHARGE LAMP BALLAST WITH DC-DC CONVERTER

TECHNICAL FIELD

The present invention relates to a ballast for a discharge lamp such as a high intensity discharge (HID) lamp, and more particularly to an electronic ballast including a DC—DC converter which derives an input DC voltage from a DC voltage source such as a battery to provide a high DC voltage for operating the lamp, and also relates to a method of operating the lamp with the use of the DC—DC converter.

BACKGROUND ART

A typical electronic ballast for the HID lamp is known to include a DC—DC converter providing an increased DC output, and an inverter which converts the DC output into an AC power for driving the lamp. The DC—DC converter includes a switching element which is driven to repetitively interrupt an input DC voltage to regulate the resulting DC output. Also included in the ballast is a controller which monitors the DC output and varies the duty of the switching element of the DC—DC converter based on the monitored DC output in order to regulate the DC output in a feedback manner, thereby generating a pre-starting voltage required for the lamp to be ignited, in addition to a maintaining voltage required to keep operating the lamp once started.

In order to turn on the lamp, the DC—DC converter is firstly controlled to increase the output DC voltage to a pre-starting voltage which is sufficiently high to make the lamp ready for being ignited for initiating the discharge of the lamp. In order to successfully start the lamp, the lamp has to be kept at the pre-starting voltage for a certain time period until the lamp is ignited. Generally, the pre-starting voltage is defined as a high limit voltage that the DC—DC converter is designed to keep generating until the lamp is ignited, i.e., while there is no-load connected to the converter. However, the time required for the DC—DC converter to increase its output DC voltage from zero to the pre-starting voltage will depends upon the input DC voltage available from a DC voltage source. Accordingly, in case where the available input DC voltage is not expected to be constant, the pre-starting voltage is reached at different times. That is, when the available input DC voltage lowers, the pre-starting voltage can be reached after a longer time, thereby correspondingly delay the starting of the discharge lamp. Since the input DC voltage lowering is likely in actual application environments, such delay has to be avoided in order to satisfy a demand of starting the lamp constantly at a uniform response and without being conscious of the input DC voltage variation.

DISCLOSURE OF THE INVENTION

In view of the above insufficiency, the present invention has been achieved to provide an improved ballast which is capable of making a consistent lamp start irrespective of a possible variation in an input DC voltage available from the DC power source. The ballast in accordance with the present invention includes a DC—DC converter adapted to receive the input DC voltage from the DC voltage source. The DC—DC converter has a switching element which is driven to repetitively switch the input DC voltage at a suitable switching frequencies and for a suitable on-period so as to regulate a DC output being applied to drive the discharge lamp. Also included in the ballast is a controller which monitors the DC output and makes a feedback control of varying the duty of the switching element based upon the monitored DC output in order to regulate the DC output such that the DC—DC converter provides a pre-starting voltage for enabling the lamp to start as well as an operating voltage for keeping the operation of the lamp. The ballast further includes an input DC voltage monitor which monitors the input DC voltage supplied from the DC voltage source. The characterizing feature of the present invention resides in that the controller includes a start-accelerating means which varies at least one of the switching frequency and the on-period of the switching element based upon the monitored input DC voltage in a direction of accelerating the increase of the output DC voltage towards the pre-starting voltage until the output DC voltage reaches the starting voltage. With this scheme, it is possible to increase the output DC voltage to the pre-starting voltage, irrespective of a possible variation in the input DC voltage, in an intended short time period substantially equal to the time as is required when the input DC voltage is at an available maximum voltage, thereby assuring a rapid lamp start while compensating for the lowered input DC voltage.

The start-accelerating means is preferred to increase the on-period and/or lower the switching frequency of the switching element as the input DC voltage lowers in order to realize a uniform rate of increasing the output voltage to the pre-starting voltage irrespective of the possible variation in the input DC voltage.

In a preferred embodiment, the ballast includes a booster which amplifies a voltage derived from within the DC—DC converter into a boosted voltage. The booster is of a nature which provides the boosting voltage that increases at a higher rate as the switching frequency of the switching element increases. An igniter is associated with the booster to raise the boosted voltage to an igniting voltage which is applied to the discharge lamp after the output DC voltage reaches the pre-starting voltage, in order to ignite the lamp. The start-accelerating means is configured to increase the switching frequency of the switching element in response to the output DC voltage reaching a first threshold which is lower than the pre-starting voltage. Thus, it is possible to firstly accelerate the increase of the output DC voltage of the converter, and then to accelerate the increase of the boosted voltage to a sufficient level for the igniter to ignite the lamp, thereby giving an optimum combination of the output DC voltage and the boosted voltage for speeding up the lamp start. For this purpose, the first threshold is selected such that the output DC voltage reaches the pre-starting voltage before the boosted voltage reaches the level sufficient for the igniter to ignite the lamp.

Preferably, the start-accelerating means operates to increase the switching frequency continuously or stepwise from a first switching frequency to a second switching frequency in response to the output DC voltage reaching the first threshold.

Instead of using the first threshold, the start-accelerating means may be configured to increase the switching frequency in response to the output DC voltage firstly reaching the pre-starting voltage.

Further, when the DC—DC converter includes a low-pass filter to smoothing the output DC voltage, the ballast of the present invention is configured to restrain undesired resonance which would occur in resonance with a natural frequency of the low-pass filter while the DC—DC converter keeps generating the pre-starting voltage as being intermittently activated and deactivate just before starting the lamp. For this purpose of restraining the undesired resonance, the start-accelerating means is preferred to decrease the on-period of the switching element in response to the output DC voltage reaching a second threshold which is lower than the pre-starting voltage. Thus, just prior to and subsequent to the DC—DC converter providing the pre-starting voltage, the converter can be made to increase the output voltage rather gradually to supplement a small energy for maintaining the pre-starting voltage, thereby enabling to continue limiting the output voltage to the pre-starting voltage without causing the undesired resonance. Therefore, the ballast can be protected from generating an unduly high voltage due to the unintended resonance for safe and reliable lamp operation. To this end, the start-accelerating means may be configured to decrease the on-period of the switching element continuously or stepwise in response to the output voltage reaching the second threshold.

Instead of using the second threshold, the start-accelerating means may be configured to decrease the on-period in response to the output DC voltage firstly reaching the pre-starting voltage.

Further, it is also advantageous to increase the switching frequency of the switching element in response to the output DC voltage reaching the second threshold, reaching firstly to the pre-starting voltage, or even to a third threshold which is lower than the pre-starting voltage and is different from the second threshold. This control of increasing the switching frequency just around the output voltage reaching the pre-starting voltage can be effective alone or in combination with the above scheme of decreasing the on-period for the purpose of restraining the undesired resonance.

Still further, instead of using one or more thresholds, the start-accelerating means may be configured to vary the switching frequency and/or the on-period as a function of the monitored output DC voltage until the output DC voltage reaches the pre-starting voltage for the purpose of speeding-up the lamp start and/or restraining the undesired resonance.

These and still other objects and advantageous features of the present invention will become more apparent from the following detailed description of the preferred embodiment when taken in conjunction with the attached drawings.

BRIEF DESCRIPTION OF THE DRAWIGNS

FIG. 4 is a chart illustrating the basic operation of the ballast prior to starting the lamp;

BEST MODE FOR CARRYING OUT THE INVENTION

A ballast for a discharge lamp of the present invention is particularly suitable for operating a high intensity head light of an automobile using a car battery as an input DC power source, although the present invention is not necessarily limited to this particular application.

Figure 1:
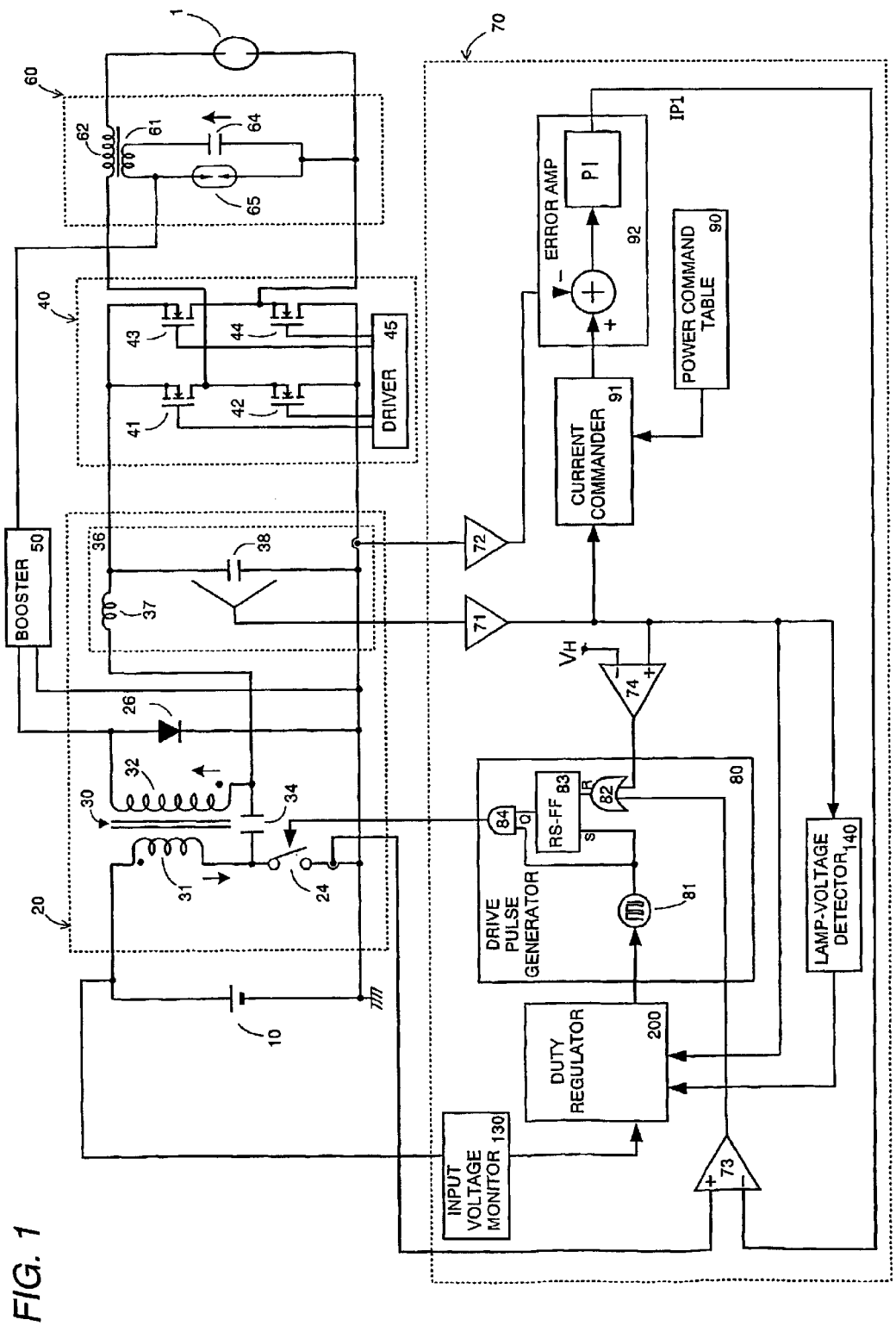
FIG. 1 is a circuit diagram illustrating a ballast in accordance with a preferred embodiment of the present invention.

Referring now to FIG. 1, there is shown the ballast in accordance with a first embodiment of the present invention. The ballast is composed of a DC—DC converter 20 connected to receive an input DC voltage from the DC power source 10 such as a car battery for providing a regulated DC output, and an inverter 40 which converts the DC output into a low frequency AC power to be applied to a discharge lamp 1. Also included in the ballast are a booster 50 which derives a power from a portion of the DC—DC converter 20 to generate a boosted voltage, and an igniter 60 which produces from the boosted voltage an igniting voltage to be applied for igniting the lamp 1. The ballast further includes a controller 70 which controls the DC—DC converter 20 and the inverter 40 for starting the lamp and maintaining the lamp operation mainly based upon a monitored output DC power of the DC—DC converter 20.

The DC—DC converter 20 includes a transformer 30 and a switching element 24 connected in series with a primary winding 31 of the transformer 30 across the DC power source 10. The switching element 24 is controlled to repetitively turn on and off at varying frequencies and varying on-periods in order to accumulate an energy into the transformer 30 and a capacitor 34. When the switching element 24 is on, an input current flows from the DC power source 10 through primary winding 31 to store the energy therein. Capacitor 34 is connected between the primary winding 31 and a secondary winding 32, and in series relation with a diode 26 across the DC voltage source 10 so that, when the switching element 24 is off, another input current flows through the primary winding 31, the capacitor 34, the secondary winding 32, and the diode 26 to accumulate the energy in the windings 31 and 32 as well as in capacitor 34. The series combination of the diode 26 and the secondary winding 32 is connected across a low-pass filter 36 composed of an inductor 37 and a capacitor 38, i.e., an output to the inverter 40 such that, when the switching element 24 is off, the energy accumulated in secondary winding 32 is released through the diode 26 to provide an output DC voltage to the inverter 40. The capacitor 34 releases its energy while the switching element 24 is on to continue providing the output DC voltage to the inverter 40. The illustrated converter 20 is shown only for an exemplary purpose and may be configured differently provided that the like switching element is utilized to regulate the DC output. For example, known DC—DC converters of the fly-back type or the buck-boost type can be equally utilized.

The inverter 40 is of a full-bridge configuration having four switches 41, 42, 43 and 44 which are driven by a driver 45 to turn on and off in such a manner that one diagonally opposed pair of switches 41 and 44 are turn on and off alternately with the other diagonally opposed pair of switches 42 and 43 to provide a low frequency AC voltage for operating the lamp. The driver 45 is connected to receive a low frequency control signal from the controller 70 to make the low frequency inverter output. Although the ballast of illustrated embodiment includes the inverter for operating the lamp 1, the present invention should not be necessarily limited thereto and may not require the inverter when operating a particular type of the discharge lamp.

The igniter 60 includes a transformer with a primary winding 61 and a secondary winding 62 which is connected in series with the lamp 1 in a path of feeding the inverter output. Connected across the primary winding 61 is a series combination of a capacitor 64 and a discharge gap switch 65 which is responsible for discharging the capacitor 64 so as to induce a high igniting voltage at the secondary winding 62 for applying it to ignite the lamp.

The capacitor 64 is charged by the booster 50 which makes the use of an oscillating voltage appearing in the circuit of the converter 20 to provide a boosted DC voltage sufficient for rapidly charging the capacitor 64. The booster 50 is configured as a Cockcroft-Walton voltage multiplier composed of diodes, capacitors, and resistors. The booster 50 has its input connected across the diode 26 of the converter 20 so as to provide the boosted DC voltage which will increase at an increased rate as the switching frequency of the switching element 24 increases.

The controller 70 is provided to regulate the output DC power of the DC—DC converter 20 mainly by a closed-loop control, i.e., in a feedback manner based upon the converter's output in order to provide a pre-starting lamp voltage enabling the lamp to start as well as an operating lamp voltage once after the lamp is started. The pre-starting voltage is defined as a high limit voltage to which the DC—DC converter's output is limited and is slightly higher than an actual minimum lamp starting voltage which enables the lamp to start. That is, the pre-starting voltage is defined by an upper limit $V_H$ of 380 V, while the actual lamp starting voltage is about 340 V, for example.

Figure 2:
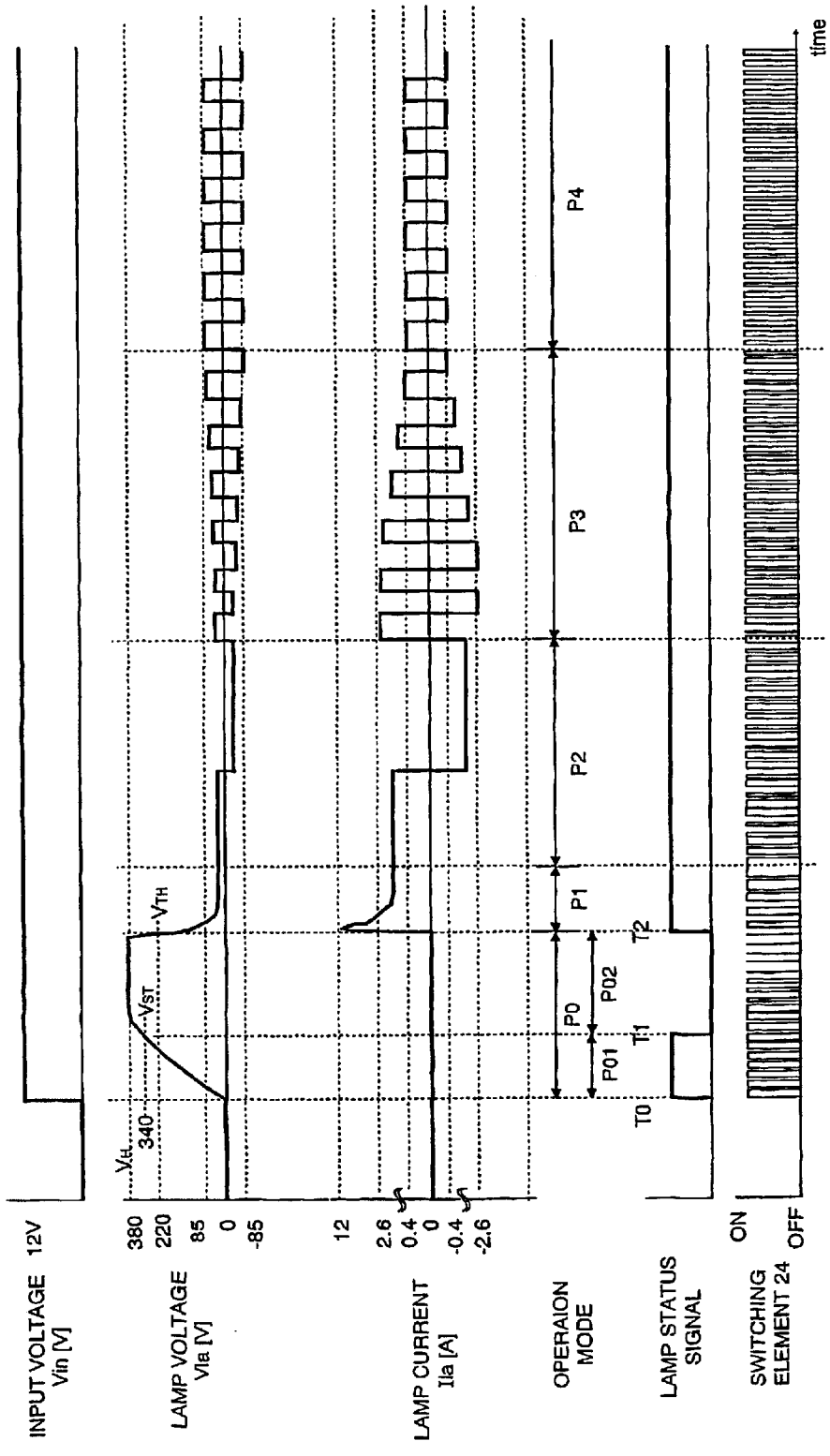
FIG. 2 is a waveform chart illustrating a general operation of the ballast.
Figure 3:
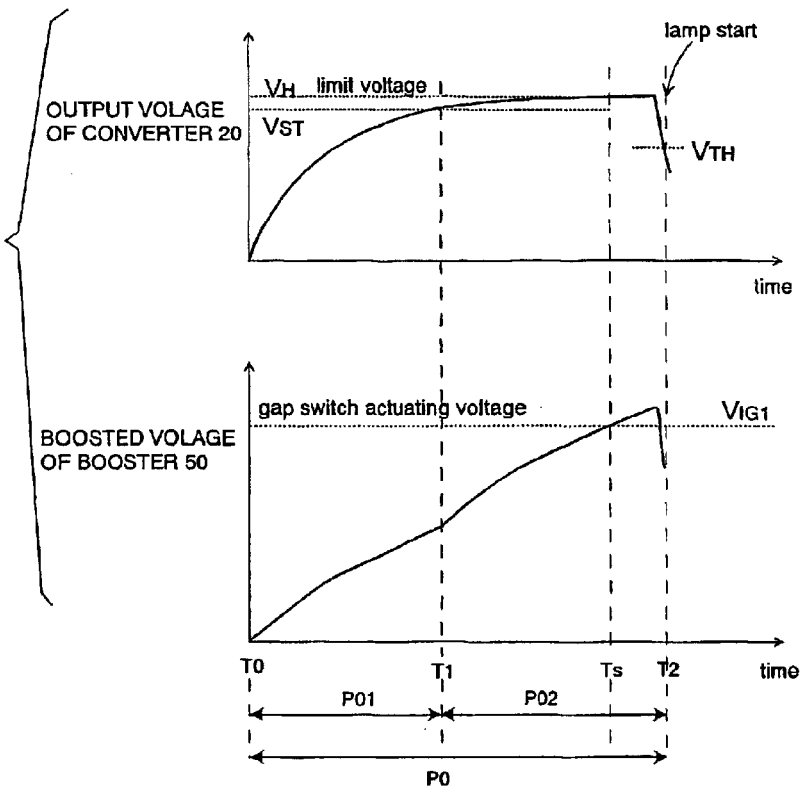
FIG. 3 is a chart illustrating outputs of the ballast for staring a discharge lamp.

FIG. 2 shows typical characteristics of the lamp voltage Vla and the lamp current Ila being supplied to start and keep operating the lamp. When the DC—DC converter 20 is energized with the lamp being off, i.e., in a no-load condition, the controller 70 makes the closed-loop control of increasing the output voltage of the DC—DC converter 20 from zero to the pre-starting of 380 V above the lamp starting voltage of 340 V, and maintaining the pre-starting voltage for some period until the lamp is ignited. Until then, the booster 50 provides to the igniter 60 the boosted voltage sufficiently high for igniting the lamp, as shown in FIG. 3. That is, the ballast is configured to increase the boosted voltage to a level sufficiently high for the igniter 60 to actuate the discharge gap switch 65 shortly after the output DC voltage reaches the pre-starting voltage above the lamp starting voltage at time Ts. As soon as the igniter 60 ignites the lamp to start discharging of the lamp, which is normally made within 20 milliseconds, for example, from the energization of the DC—DC converter 20, the lamp voltage Vla sees an abrupt decrease. This is acknowledged by the voltage lowering down to a discharge threshold $V_{TH}$ of 220V, for example. As soon as such voltage lowering is acknowledged by the controller 70, the controller 70 comes into a starting phase P1 in which a sufficient lamp current is supplied in order to complement the lamp start and proceed the lamp start successfully to a rated lamp operation phase P4 through a warm-up phase P2 and a run-up phase P3.

The present invention is dedicated to ensure a rapid lamp start and is therefore related to a pre-start phase P0 before the lamp is ignited. Prior to discussing the operation of the ballast in the pre-start phase P0, a brief explanation of the feedback control of the ballast is made herein with reference to FIG. 1. The controller 70 includes a drive pulse generator 80 which generates a drive pulse for turning on and off the switching element 24 for varying on-periods and at varying frequencies for regulating the DC output power of the converter based upon the output power. Also included in the controller 70 are an output voltage monitor 71 which monitors the output DC voltage as indicative of the lamp voltage Vla, an output current monitor 72 which monitors the output current as indicative of the lamp current Ila, and a comparator 73 which sees an input current flowing through the switching element 24. Each time the output DC voltage is detected at a comparator 74 to exceed the upper limit $V_H$, i.e., the pre-starting voltage above the minimum lamp starting voltage, the comparator 74 issues a stop signal to the drive pulse generator 80 which responds to turn off the switching element 24. Thus, the DC—DC converter 20 generates the output DC voltage which increases up to the pre-starting voltage after energization of the converter and is kept at that voltage until the lamp is ignited, as shown in FIG. 2.

The controller 70 includes a power command table 90 which stores a predetermined power command designating a power command upon which the closed-loop control relies to regulate the output DC power. The power command is fed together with the monitored output DC voltage to a current commander 91 which calculates a current command I from an equation of $I=P/V$ (where P=power command, V=monitored DC voltage). Thus obtained current command is fed to an error amplifier 92 where it is compared with the monitored output current Ila to provide a target current command IP1 through a proportional and integration process. The target current command IP1 is processed to drive the switching element 24 in order to regulate the output DC power in match with the target power command. In detail, the drive pulse generator 80 includes a PWM generator 81 which provides a train of standard pulses having a predetermined frequency and a predetermined on-period. The standard pulses are fed to a set terminal (S) of RS flip-flop 83 which provides at an output terminal (Q) a drive signal of turning on the switching element 24 at the rising edge of each pulse. The output of the RS flip-flop 83 is fed to drive the switching element 24 through another AND-gate 84 which also receives the pulse from the PWM generator 81, so that the switching element 24 is turned off at the falling edge of each pulse from PWM generator 81. Further, the RS flip-flop 83 receives at its reset terminal (R) the outputs of the comparators 73 and 74 through an logical OR-gate 82 in order to turn off the switching element 24 when the output voltage exceeds the upper limit $V_H$ or the monitored input current exceeds the target current command IP1, whichever comes earlier. Thus, the switching element 24 is driven to turn on and off basically in accordance with the standard pulse from the PWM generator 81 and is driven with varying on-periods to regulate the output DC power in accordance with the monitored output DC power.

Also included in the controller 70 is a lamp-voltage detector 140 which compares the output DC voltage with the discharge threshold $V_{TH}$ and with a lamp start threshold $V_{ST}$, in order to determine whether or not the lamp is started. As shown in FIG. 2, the detector 140 provides a lamp status signal which is high while the output DC voltage increases from zero to the lamp start threshold $V_{ST}$ and also after the output DC voltage lowers below the threshold $V_{TH}$ as indicative of the lamp is started. The lamp status signal is utilized in a duty regulator 200 to modify the standard pulse train, i.e., vary the switching frequency and the on-period of the switching element 24 after the output DC voltage increases to the lamp start threshold $V_{ST}$ and until it lowers to the discharge threshold $V_{TH}$.

The purpose of varying the switching frequency and the on-period after the output DC voltage reaches the lamp start threshold $V_{ST}$ is to avoid undesired resonance which would result from the associated feedback control of keeping the pre-starting voltage in the immediately subsequent period P02. That is, if the converter 20 should supplies a relatively large output power intermittently during period P02 to keep the pre-starting voltage, there would be a possibility that the output voltage become resonant with the natural frequency of the low-pass filter 36, thereby generating unduly high resonant voltage which is harmful for the ballast and the lamp. To avoid the resonance, the duty regulator 200 is configured to increase the switching frequency and decrease the on-period of the switching element 24 once after the output DC voltage increases to the lamp start threshold VST at time T1, as shown in FIG. 4, thereby providing a less output power being supplied to gradually increase the output voltage to the pre-starting voltage and then keep the output DC voltage around the pre-starting voltage without causing the undesired resonance. In other words, the energy EP supplied at every switching of the switching element 24 can be lowered to such a level as to satisfy the following inequality.

$$(1+E_P/E_L) \times T_{SW} \ll T_{LC}$$

where EL is an energy consumed due to internal circuit loss, TSW is a cycle of the switching element during period P02, and TLC is a resonant cycle of the low-pass filter 36. Accordingly, it is made to shorten an interval in which the output voltage is below or above the upper limit VH and therefore shorten a cycle of the pre-starting voltage oscillating about the upper limit VH to such an extent as not to cause the undesired resonance.

Figure 5A:
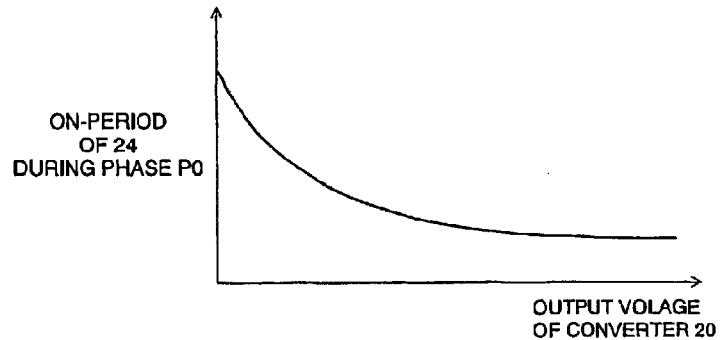
FIGS. 5A and 5B are charts illustrating another control of the ballast based upon a monitored output DC voltage of the ballast.
Figure 5B:
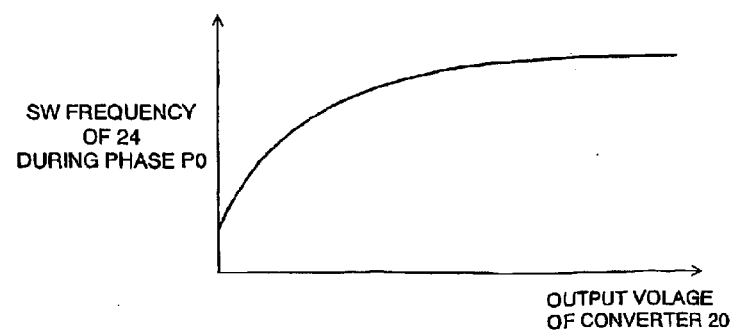

In the above explanation, the duty regulator 200 is configured to vary both of the switching frequency and the on-period in response to the output voltage reaching the lamp start threshold VST, however, it may be possible to vary either one of the switching frequency and the on-period. Further, instead of relying upon the detection of the output voltage reaching the lamp start threshold VST, the duty regulator 200 may be configured to decrease the on-period and/or increase the switching frequency in response to the output voltage reaching the upper limit VH. Still, the duty regulator 200 may be configured to constantly monitor the output DC voltage and select the switching frequency and/or the on-period that vary depending upon the monitored output DC voltage, as shown in FIGS. 5A and 5B, for control of the switching element 24 during the period P0 starting from the energization (time T0) of the ballast and ending at the lamp discharge (time T2). It is noted in this connection that the on-period may decrease continuously and/or the switching frequency may increase continuously in response to the output DC voltage reaching the lamp start threshold VST.

Figure 6:
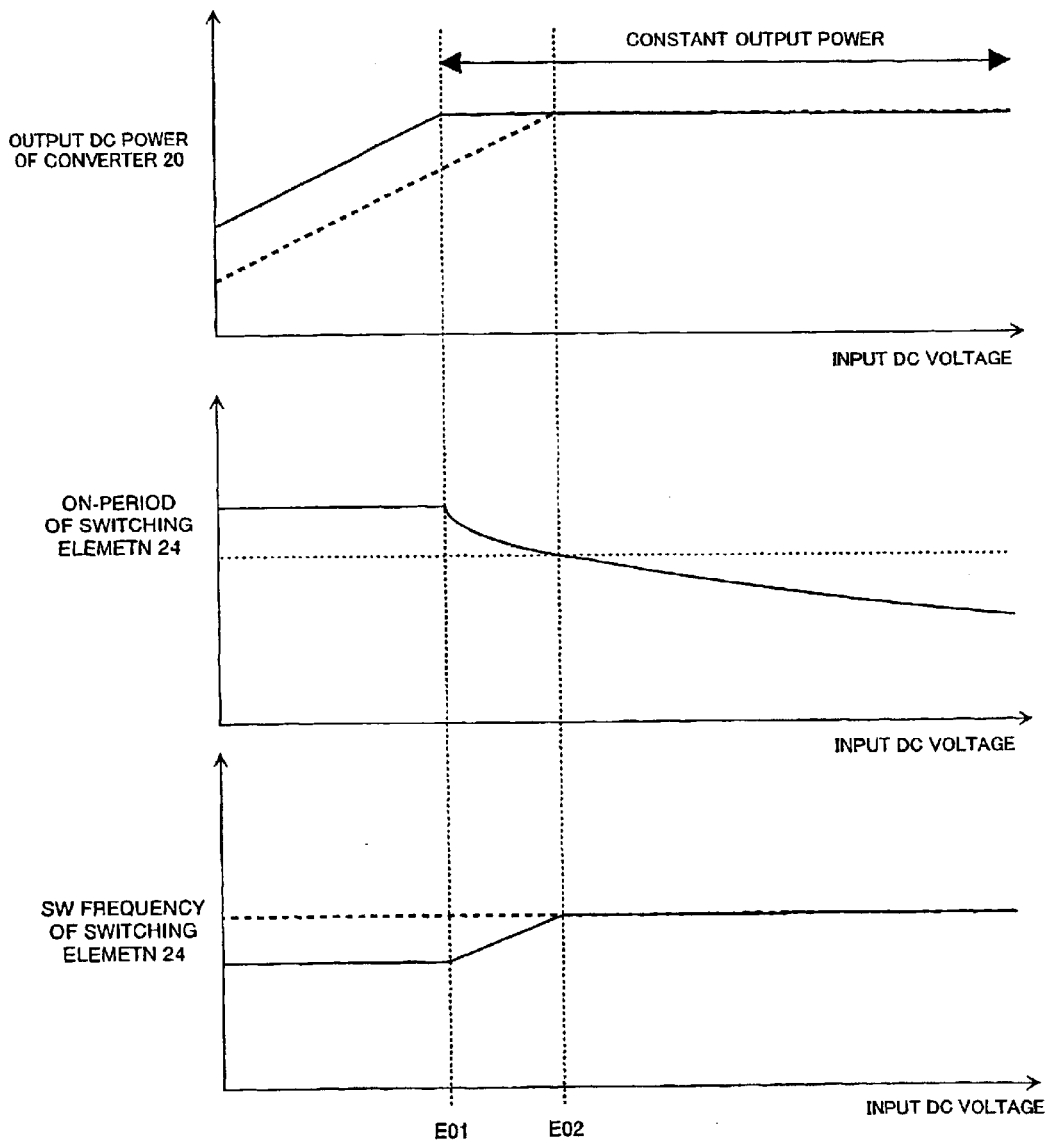
FIG. 6 is a chart illustrating a basic feature of the ballast.

Now referring to FIG. 6, the rapid lamp start realized in the present invention will be discussed. The input DC voltage available from the DC voltage source 10 is likely to vary in actual application environments. In view of this, the ballast of the present invention is contemplated to compensate for possible lowering of the input DC voltage for assuring the rapid lamp start independently of the input DC voltage. That is, the controller 70 is configured to decrease the switching frequency and/or increase the on-period of the element 24 as the input DC voltage lowers, as seen in the figure, in order that the converter 20 can provide a constant output power sufficient for increasing the output DC voltage at a uniform rate to the lamp starting voltage, i.e., the pre-starting voltage. For this purpose, the ballast is configured such that the output DC voltage reaches the pre-starting voltage in a predetermined short time as is required to increase the output DC voltage to the pre-starting voltage when the input DC voltage is at an available maximum voltage. In the absence of the above control, the output power generated by the converter 20 would decrease as the input DC voltage lowers, thereby causing a certain delay in the output DC voltage reaching the pre-starting voltage and therefore a corresponding delay in the boosted voltage reaching the sufficient level for igniting the lamp, thereby deferring the lamp start. As demonstrated in the figure, it is mostly preferred to vary both of the switching frequency as well as the on-period to extend a lowest limit E01 of the input DC voltage, as indicated by solid lines, within which the intended rapid lamp start is assured. However, it may be sufficient to vary only the on-period, as indicated by dotted lines, when the input DC voltage is expected to be above a lower limit E02. For example, when the ballast is powered by a rated input DC voltage of 14V, the lower limit E02 is extended to about 11V and the lowest limit E01 is to about 9 V. Further, it is equally possible to vary only the switching frequency depending upon the input DC voltage.

In order to realize the above effect, the controller 70 includes an input DC monitor 130 providing a monitored input DC voltage to the duty regulator 200 which responds to increase the on-duty and/or decrease the switching frequency as the input DC voltage lowers. That is, the duty regulator 200 modifies the standard pulses generated at the PWM generator 81 in accordance with the input DC voltage so as to expand a permissible input DC voltage range where the constant output power of the converter 20 is assured to enable the rapid lamp start within about 20 milliseconds, for example.

Figure 7:
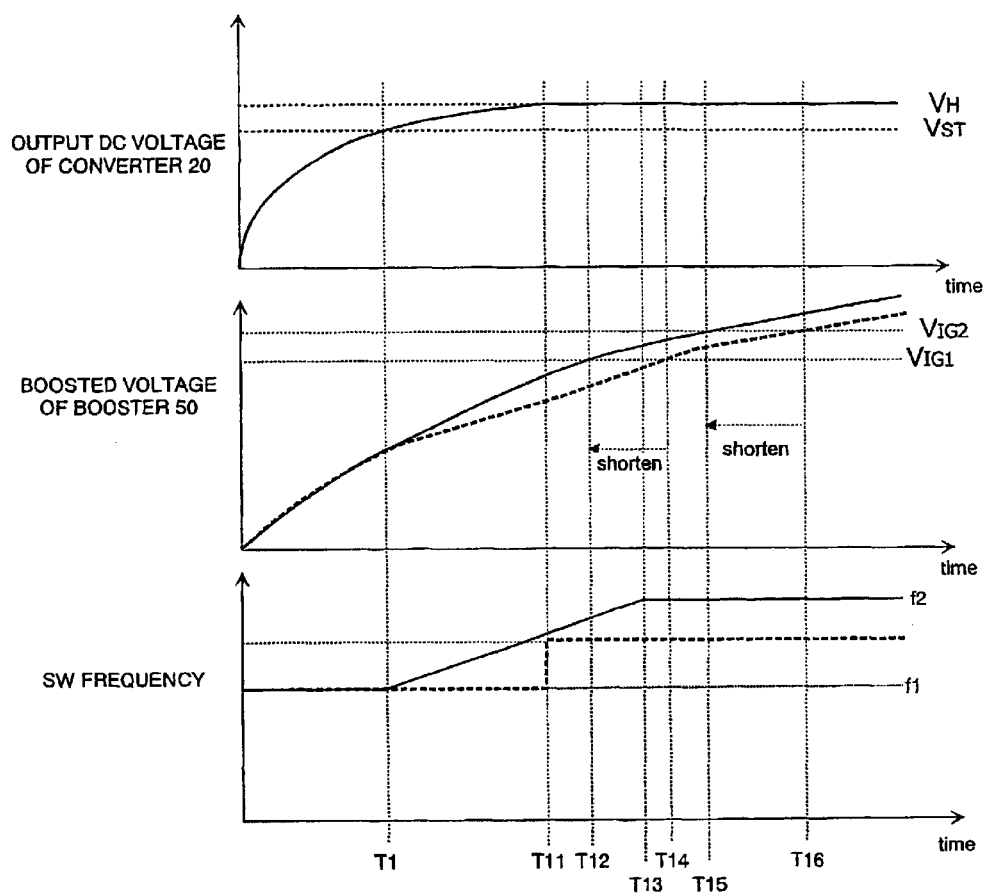
FIG. 7 is a chart illustrating another basic feature of the ballast.

Now referring back to FIG. 3, it is pointed out that the boosted voltage from the booster 50 can be increased rapidly to the level VIG1 sufficient for the igniter 60 to ignite the lamp 1 after the output voltage of the converter 20 reaches the pre-starting voltage. In view of the characteristic of the booster 50 that the boosted voltage will increase at a higher rate as the switching frequency of the switching element 24 increases, a control is made to increase the switching frequency after the output voltage is increased close to the pre-starting voltage in order to satisfy a rapid increase of the output voltage as well as to a rapid increase of the boosted voltage up to a level sufficient for igniting the lamp. One approach is to increase the switching frequency of the switching element 24 in response to the output voltage increasing to the upper limit VH, as indicated by dotted lines in FIG. 7. Another approach is to increase the switching frequency in response to the output voltage increasing to the lamp start threshold VST, as indicated by solid lines in the figure. With either approach, the boosted voltage is increased to the level VIG1 at a higher rate than in a case where the switching frequency is kept unchanged, thereby enabling the rapid lamp start.

It is preferred, as indicated by solid lines, to increase the switching frequency in response to the output voltage increasing to the lamp start threshold VST, rather than reaching the upper limit VH, i.e., the pre-starting voltage in order to further shorten the time necessary to make the lamp ready for being ignited. As is clear from FIG. 7, the boosted voltage can increase at a higher rate to the level VIG1, as indicated by solid lines, than in the case where the switching frequency increases in response to the output voltage reaching the upper limit VH, as indicated by dotted lines. In detail, in response to the output voltage of the converter 20 increasing to the lamp start threshold VST that is slightly lower than the upper limit VH, the duty regulator 200 responds to increase the switching frequency continuously from f1 to f2 with time T1 to T13 until which the output voltage is expected to settle on the pre-starting voltage. During this period, the boosted voltage reaches the level VIG1 at time T12, allowing the igniter 60 to ignite the lamp successfully. In contrast, when the switching frequency is shifted from f1 to a higher one in response to the output voltage increasing to the upper limit $V_H$ at time T11, as shown by dotted lines in the figure, the boosted voltage reaches the level $V_{IG}1$ later at time T14. Therefore, it is made possible to shorten the time from T14 to T12 for making the ballast ready for igniting the ballast. Even when the boosted voltage is required to increase to a higher level $V_{IG}2$ for igniting the lamp, the lamp start can be equally shortened from time T16 to time T15, as indicated in the figure.

In the above embodiment, the switching frequency is set to increase in response to the output voltage increasing to the lamp start threshold $V_{ST}$, it is equally possible to use another threshold which is different from the lamp start threshold but is lower than the upper limit $V_H$ in order to give an optimum effect of rapidly starting the lamp while preventing the resonance. As is recalled from the explanation with regard to the prevention of the resonance, the duty regulator 200 operates to also decrease the on-period of the switching element in addition to increasing the switching frequency in response to the output voltage reaching the lamp start threshold $V_{ST}$. In this connection, the duty regulator 200 may be configured to use different thresholds respectively for determining timings of increasing the switching frequency and of decreasing the on-period. These thresholds may be suitable selected with one threshold greater than the other threshold in order to provide an optimum performance.

Figure 8:
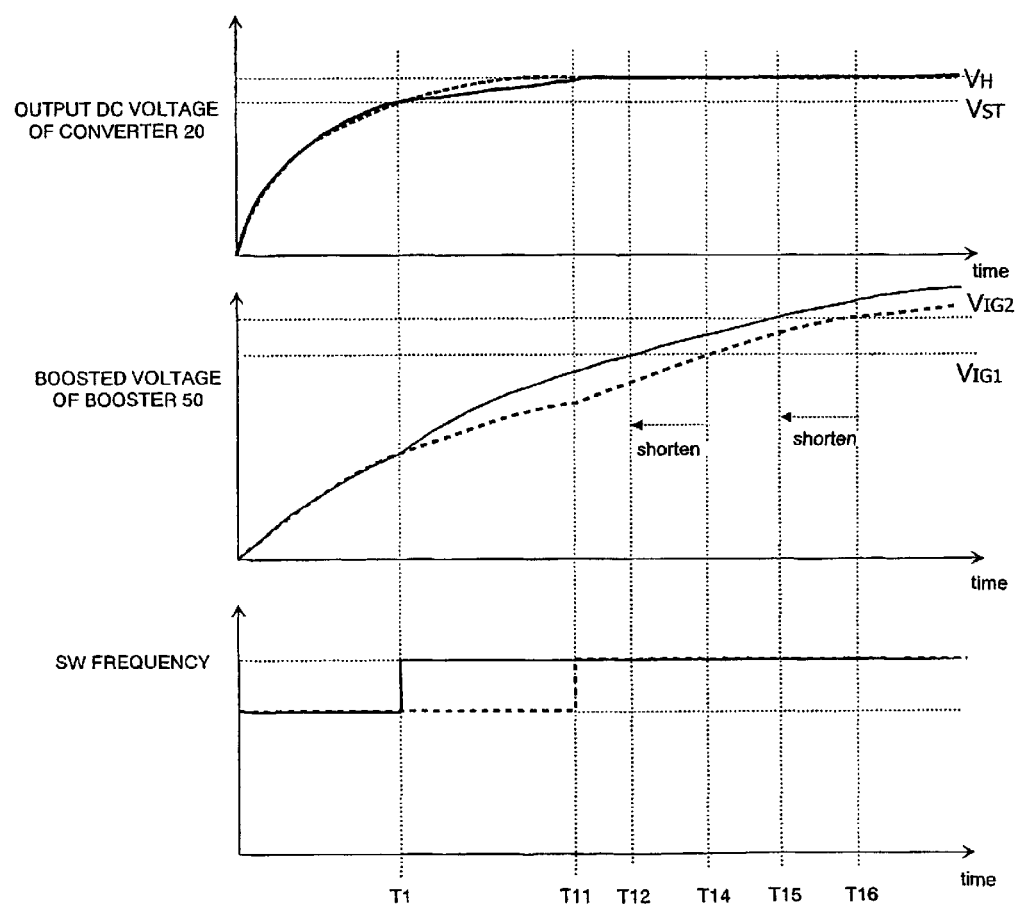
FIG. 8 is a chart illustrating a modified feature of the ballast.

Further, instead of continuously increasing the switching frequency, it is equally possible to increase it stepwise, as indicated by solid lines in FIG. 8, in response to the output voltage increasing to the lamp start threshold $V_{ST}$. Also in this instance, the time for increasing the boosted voltage to levels $V_{IG}1$ and $V_{IG}2$ can be further shortened, as indicated by solid lines, relative to the case in which the switching frequency is increased only after the output voltage reaches the upper limit $V_H$, as indicated by dotted lines. As a matter of course, another threshold other than the lamp start threshold $V_{ST}$ may be utilized for determination of a timing of increasing the switching frequency.

Although the above embodiments and modifications are particularly suitable for carrying out the invention, the present invention should not be limited thereto and may include further modifications. For instance, when another booster is utilized which derives its input DC voltage other than from within the converter 20 and is therefore not limited to the above characteristic of increasing the boosted voltage at a higher rate as the switching frequency of the switching element increases, it is not necessarily to vary the switching frequency in response to the output voltage reaching the threshold $V_{ST}$. Also in case when the low-pass filter 36 is not required, it is also not necessary to vary the switching frequency and/or the on-period of the switching element after the output voltage reaching the threshold $V_{ST}$ for avoiding the resonance. Further, the controller may be of any design provided that it can vary the switching frequency and/or the on-period of the switching element in accordance with particular events acknowledged during the pre-start phase P0 and the subsequent phases for driving the converter in the manner as described in the above. Still, it should be noted that any individual features disclosed herein may be suitably combined to realize a modified ballast which is also within the scope of the invention.

This application is based upon and claims the priority of Japanese Patent Application No. 2001-005706, filed in Japan on Jan. 12, 2001 and No. 2001-215721 filed in Japan on Jul. 16, 2001, the entire contents of which are expressly incorporated by reference herein.

What is claimed is:

1. A ballast for a discharge lamp comprising:
    a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;
    a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;
    wherein said ballast includes:
    an input DC voltage monitor which monitors an input DC voltage supplied from said DC voltage source, and
    said controller including a start-accelerating means which varies at least one of the switching frequency and the on-period of said switching element based upon the monitored input DC voltage in a direction of accelerating the increase of the output DC voltage towards said pre-starting voltage,
    said start-accelerating means lowering the switching frequency of said switching element as the input DC voltage decreases.

2. A ballast for a discharge lamp comprising:
    a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;
    a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;
    wherein said ballast includes:
    an input DC voltage monitor which monitors an input DC voltage supplied from said DC voltage source, and
    said controller including a start-accelerating means which varies at least one of the switching frequency and the on-period of said switching element based upon the monitored input DC voltage in a direction of accelerating the increase of the output DC voltage towards said pre-starting voltage, said start-accelerating means increasing the on-period and lowers the switching frequency of said switching element as the input DC voltage decreases.

3. A ballast for a discharge lamp comprising:
    a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;
    a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said ballast further ballast further including:

a booster which amplifies a voltage derived from within said DC—DC converter into a boosted voltage, said booster being configured to provide said boosted voltage which increases at a higher rate as the switching frequency of said switching element increases;

an igniter which raises said boosted voltage to an igniting voltage and applies said igniting voltage to said discharge lamp in order to ignite the discharge lamp; and an output DC voltage monitor which monitors an output DC voltage of said DC—DC converter;

said start-accelerating means increasing said switching frequency of said switching element in response to said output DC voltage reaching a first threshold which is lower than said pre-starting voltage.

4. The ballast as set forth in claim 3, wherein
said first threshold is selected such that the output DC voltage reaches said pre-starting voltage before said boosted voltage reaches a level sufficient for said igniter to ignite the lamp.

5. The ballast as set forth in claim 3, wherein
said start-accelerating means increases said switching frequency stepwise from a first switching frequency to a second switching frequency in response to said output DC voltage reaching said first threshold.

6. The ballast as set forth in claim 3, wherein
said start-accelerating means increases said switching frequency continuously from a first switching frequency to a second switching frequency in response to said output DC voltage reaching said first threshold.

7. The ballast as set forth in claim 3, wherein
said booster is a multi-stage voltage booster.

8. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said ballast further including:

a booster which amplifies a voltage derived from within said DC—DC converter into a boosted voltage, said booster being configured to provide said boosted voltage which increases at a higher rate as the switching frequency of said switching element increases;

an igniter which raises said boosted voltage to an igniting voltage and applies said igniting voltage to said discharge lamp in order to ignite the discharge lamp; and said controller operating to keep the pre-starting voltage until the discharge lamp is ignited, said start-accelerating means increasing said switching frequency of said switching element in response to said output DC voltage firstly reaching said pre-starting voltage.

9. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said DC—DC converter including a low pass filter composed of an inductance and a capacitance for smoothing said output DC voltage, said start-accelerating means decreases the on-period of said switching element in response to said output DC voltage reaching a second threshold which is lower than said pre-starting voltage.

10. The ballast as set forth in claim 9, wherein
said start-accelerating means decreases the on-period of said switching element continuously in response to said output voltage reaching said second threshold.

11. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said start-accelerating means decreasing the on-period of said switching element in response to said output DC voltage firstly reaching said pre-starting voltage.

12. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said DC—DC converter including a low pass filter composed of an inductance and a capacitance for smoothing said output DC voltage, said start-accelerating means increases the switching frequency of said switching element in response to said output DC voltage reaching a third threshold which is lower than said pre-starting voltage.

13. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said DC—DC converter including a low pass filter composed of an inductance and a capacitance for smoothing said output DC voltage, said start-accelerating means increases the switching frequency of said switching element in response to said output DC voltage firstly reaching said pre-starting voltage.

14. The ballast as set forth in claim 12, wherein said start-accelerating means increases the switching frequency continuously in response to said output DC voltage reaching said third threshold.

15. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said DC—DC converter including a low pass filter composed of an inductance and a capacitance for smoothing said output DC voltage, said start-accelerating means increases the switching frequency of said switching element in response to said output DC voltage reaching said third threshold which is lower than said pre-starting voltage, and decreases the on-period of the switching element in response to said output DC voltage reaching a fourth threshold which is lower than said pre-starting voltage.

16. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said ballast further including:

a booster which amplifies a voltage derived from within said DC—DC converter into a boosted voltage, said booster being configured to provide said boosted voltage which increases at a higher rate as the switching frequency of said switching element increases;

an igniter which raises said boosted voltage to an igniting voltage and applies said igniting voltage to said discharge lamp in order to ignite the discharge lamp; and an output DC voltage monitor which monitors an output DC voltage of said DC—DC converter;

said start-accelerating means increasing said switching frequency of said switching element and/or decreasing the on-period of said switching element as the monitored output DC voltage increases to said pre-starting voltage.

17. A ballast for a discharge lamp comprising:

a DC—DC converter adapted to receive an input DC voltage from a DC voltage source, said DC—DC converter including a switching element which is driven to repetitively switch said input DC voltage at a suitable switching frequency and for a suitable on-period so as to regulate a DC output being applied to drive the discharge lamp;

a controller which monitors the DC output to make a feedback control of varying the duty of said switching element based upon the monitored DC output in order to regulate the DC output such that the DC—DC converter provides a high pre-starting voltage enabling the lamp to start as well as a low operating voltage for keeping the operation of the lamp;

wherein said ballast includes:

an input DC voltage monitor which monitors an input DC voltage supplied from said DC voltage source, and said controller including a start-accelerating means which varies at least one of the switching frequency and the on-period of said switching element based upon the monitored input DC voltage in a direction of accelerating the increase of the output DC voltage towards said pre-starting voltage, said DC—DC converter including a low pass filter composed of an inductance and a capacitance for smoothing said output DC voltage, said ballast further including an output DC voltage monitor which monitors an output DC voltage of said DC—DC converter, said start-accelerating means increasing the switching frequency of said switching element and/or decreasing the on-period of said switching element as the monitored output DC voltage increases to said pre-starting voltage.

* * * * *

UNITED STATES PATENT AND TRADEMARK OFFICE
CERTIFICATE OF CORRECTION

PATENT NO. : 6,861,812 B2
DATED : March 1, 2005
INVENTOR(S) : Takashi Kambara et al.

It is certified that error appears in the above-identified patent and that said Letters Patent is hereby corrected as shown below:

<u>Title page,</u>
Item [57], ABSTRACT,
Line 7, please change "in" to -- is --.

Signed and Sealed this

Twenty-third Day of August, 2005

JON W. DUDAS
*Director of the United States Patent and Trademark Office*